(12) United States Patent
Yamashita et al.

(10) Patent No.: US 8,325,174 B2
(45) Date of Patent: Dec. 4, 2012

(54) DISPLAY APPARATUS AND DISPLAY DRIVING METHOD

(75) Inventors: Junichi Yamashita, Tokyo (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 560 days.

(21) Appl. No.: 12/585,286

(22) Filed: Sep. 10, 2009

(65) Prior Publication Data

US 2010/0085345 A1     Apr. 8, 2010

(30) Foreign Application Priority Data

Oct. 7, 2008   (JP) ................................ 2008-260608

(51) Int. Cl.
    *G06F 3/038*      (2006.01)
(52) U.S. Cl. ...................................................... 345/211
(58) Field of Classification Search ........................ None
See application file for complete search history.

(56) References Cited

U.S. PATENT DOCUMENTS

2006/0170628 A1*   8/2006   Yamashita et al. ............. 345/76
2009/0201231 A1*   8/2009   Takahara et al. ................ 345/76

FOREIGN PATENT DOCUMENTS

| JP | 2003-255856 | | 9/2003 |
|---|---|---|---|
| JP | 2003-255897 | A | 9/2003 |
| JP | 2003-271095 | | 9/2003 |
| JP | 2007-102046 | | 4/2007 |
| JP | 2007-108381 | A | 4/2007 |
| JP | 2008-203659 | A | 9/2008 |
| JP | 2008-256916 | A | 10/2008 |

OTHER PUBLICATIONS

Japanese Office Action issued Nov. 24, 2011 for corresponding Japanese Application No. 2008-260608.

* cited by examiner

*Primary Examiner* — Adam R Giesy
(74) *Attorney, Agent, or Firm* — Rader Fishman & Grauer, PLLC

(57) ABSTRACT

A display apparatus includes the following components. A pixel array includes matrix-arranged pixel circuits each including at least a light emitting element, a drive transistor in which a drive voltage is applied between the drain and the source to supply a current corresponding to a signal value supplied between the gate and the source to the light emitting element, and a holding capacitor which is connected between the gate and the source of the drive transistor and which holds the input signal value. A mobility correction operating unit supplies the drive voltage to the transistor while the capacitor holds a correction signal value lower than the signal value to perform mobility correction for the transistor. A light emission operating unit allows the capacitor to hold the signal value and supplies the drive voltage to the transistor after correction to perform light emission at a luminance corresponding to the signal value.

9 Claims, 9 Drawing Sheets

FIG. 7

| Vsig | VsigL |
|---|---|
| 8 | 7.5 |
| 7 | 6.5 |
| 6 | 5.5 |
| 5 | 4.5 |
| 4 | 3.5 |
| 3 | 2.5 |
| 2 | 1.5 |

DISPLAY APPARATUS AND DISPLAY DRIVING METHOD

BACKGROUND OF THE INVENTION

1. Field of the Invention

The present invention relates to display apparatuses each including a pixel array including pixel circuits arranged in a matrix and display driving methods for such display apparatuses. The present invention relates to a display apparatus including, for example, an organic electroluminescent (EL) element as a light emitting element.

2. Description of the Related Art

For example, as disclosed in Japanese Unexamined Patent Application Publication Nos. 2003-255856 and 2003-271095, image display apparatuses including an organic EL element in each pixel have been developed. Since the organic EL element is a self-luminous element, such an image display apparatus has advantages in that, for example, the visibility of an image is higher than that of a liquid crystal display, it is unnecessary to provide a backlight for the apparatus, and the response speed is higher than that of the liquid crystal display. A luminance level (grayscale level) of each light emitting element can be controlled in accordance with a current flowing through the element. In other words, the apparatus is of a current-controlled type.

Methods of driving organic EL displays include a simple matrix method and an active matrix method in a manner similar to methods of driving liquid crystal displays. According to the former method, a display can be allowed to have a simple structure but it is difficult to realize a large-size and high-definition display. Accordingly, active matrix type displays are being developed actively. According to the active matrix-method, current flowing through a light emitting element in each pixel circuit is controlled by an active element (typically, a thin film transistor (TFT)) disposed in the pixel circuit.

SUMMARY OF THE INVENTION

Strong demands for the configuration of such a pixel circuit including an organic EL element are improvement in display quality by correcting an unevenness in luminance of each pixel, higher luminance, and higher definition.

Various circuit configurations have been studied from the above-described viewpoints. For example, Japanese Unexamined Patent Application Publication No. 2007-102046 discloses the configuration and operation of a pixel circuit capable of cancelling out a variation in threshold voltage of a drive transistor in each pixel and a variation in mobility thereof to correct an unevenness in luminance of each pixel.

It is desirable to provide the configuration and operation of a pixel circuit suitable for higher definition and higher luminance in a display apparatus including an organic EL element, in particular, achieve an operation suitable for mobility correction.

According to an embodiment of the present invention, a display apparatus includes a pixel array including pixel circuits arranged in a matrix, each pixel circuit including at least a light emitting element, a drive transistor in which a drive voltage is applied between the drain and the source to supply a current corresponding to a signal value supplied between the gate and the source to the light emitting element, and a holding capacitor which is connected between the gate and the source of the drive transistor and which holds the input signal value, mobility correction operating means for supplying the drive voltage to the drive transistor while allowing the holding capacitor to hold a correction signal value that is a lower voltage than that of the signal value, which is to be supplied to the holding capacitor, to perform a mobility correction operation for correcting the mobility of the drive transistor, and light emission operating means for allowing the holding capacitor to hold the signal value and supplying the drive voltage to the drive transistor after the mobility correction operation to perform a light emission operation for causing the light emitting element to emit light at a luminance corresponding to the signal value.

In the embodiment, preferably, the display apparatus further includes a signal selector configured to supply the signal value, the correction signal value, and a potential as a reference value to signal lines arranged in columns in the pixel array, a writing scanner configured to drive write control lines arranged in rows in the pixel array to apply the potential in the signal line to the pixel circuit, and a driving control scanner configured to apply the drive voltage to the drive transistor of the pixel circuit using power control lines arranged in rows in the pixel array. The mobility correction operating means is realized by an operation, performed by the writing scanner, for setting the correction signal value supplied from the signal line to a gate potential of the drive transistor and an operation, performed by the driving control scanner, for supplying the drive voltage to the drive transistor. The light emission operating means is realized by an operation, performed by the writing scanner, for setting the signal value supplied from the signal line to the gate potential of the drive transistor and an operation, performed by the driving control scanner, for supplying the drive voltage to the drive transistor.

In this embodiment, preferably, each pixel circuit further includes a sampling transistor in addition to the light emitting element, the drive transistor, and the holding capacitor. The gate of the sampling transistor is connected to the write control line, one of the source and the drain thereof is connected to the signal line, and the other one is connected to the gate of the drive transistor. While a potential applied from the signal selector to the signal line is the correction signal value, the writing scanner brings the sampling transistor into conduction and, after that, the driving control scanner performs the operation for supplying the drive voltage to the drive transistor, thus performing the operation of the mobility correction operating means. While a potential applied from the signal selector to the signal line is the signal value, the writing scanner brings the sampling transistor into conduction and, after that, the driving control scanner performs the operation for supplying the drive voltage to the drive transistor, thus performing the operation of the light emission operating means.

According to another embodiment of the present invention, there is provided a display driving method for a display apparatus including a pixel array including pixel circuits arranged in a matrix, each pixel circuit including at least a light emitting element, a drive transistor in which a drive voltage is applied between the drain and the source to supply a current corresponding to a signal value supplied between the gate and the source to the light emitting element, and a holding capacitor which is connected between the gate and the source of the drive transistor and which holds the input signal value. The method includes the steps of supplying the drive voltage to the drive transistor while allowing the holding capacitor to hold a correction signal value that is a lower voltage than that of the signal value, which is to be supplied to the holding capacitor, to perform a mobility correction operation for correcting the mobility of the drive transistor, and allowing the holding capacitor to hold the signal value and supplying the drive voltage to the drive transistor after the mobility correction operation to perform a light emission operation for causing the light emitting element to emit light at a luminance corresponding to the signal value.

A reduction in size of each pixel accompanying higher definition of pixels of an organic EL display apparatus necessarily leads to a decrease in capacitance of a capacitor component in each pixel circuit. Furthermore, higher luminance may cause an increase in voltage as a signal value and an increase in size of a transistor.

Assuming that there is a variation in mobility characteristics of a drive transistor in each pixel circuit, even when the same signal values are supplied to the pixel circuits, the amount of current flowing into each light emitting element (e.g., an organic EL element) varies from pixel to pixel, thus leading to a deterioration in image quality. To avoid such a problem, mobility correction is performed. Disadvantageously, a mobility correction time (time during which the source potential of the drive transistor subjected to mobility correction increases) is shortened due to a reduction in pixel capacitance or in accordance with a voltage as a signal value of a high luminance. Accordingly, proper mobility correction may not be performed.

According to the above-described embodiments of the present invention, mobility correction is performed while the correction signal value that is a lower voltage than that of the signal value is supplied between the gate and the source of the drive transistor. After the mobility correction, the signal value to be supplied originally is supplied between the gate and the source of the drive transistor, thus causing the light emission operation.

In other words, according to the embodiments of the present invention, a mobility correction voltage necessary for a signal value corresponding to an original grayscale level is set to a correction signal value corresponding to a lower grayscale level. Consequently, a mobility correction time necessary to obtain a target luminance can be extended longer than that in related art.

The embodiments of the present invention can prevent a mobility correction time from being too short and achieve proper mobility correction.

Accordingly, even when higher definition and higher luminance of a panel are advanced, proper mobility correction can be achieved, thus contributing to improvement of image quality.

BRIEF DESCRIPTION OF THE DRAWINGS

FIG. 7 is a diagram explaining correction signal values in the embodiment;

DESCRIPTION OF THE PREFERRED EMBODIMENTS

A display apparatus including an organic EL element will be described below as a display apparatus according to an embodiment of the present invention in the following order:
1. Structure of Display Apparatus According to Embodiment;
2. Operation of Pixel Circuit in Process Leading to Embodiment; and
3. Operation of Pixel Circuit in Embodiment.

1. Structure of Display Apparatus According to Embodiment

Figure 1:
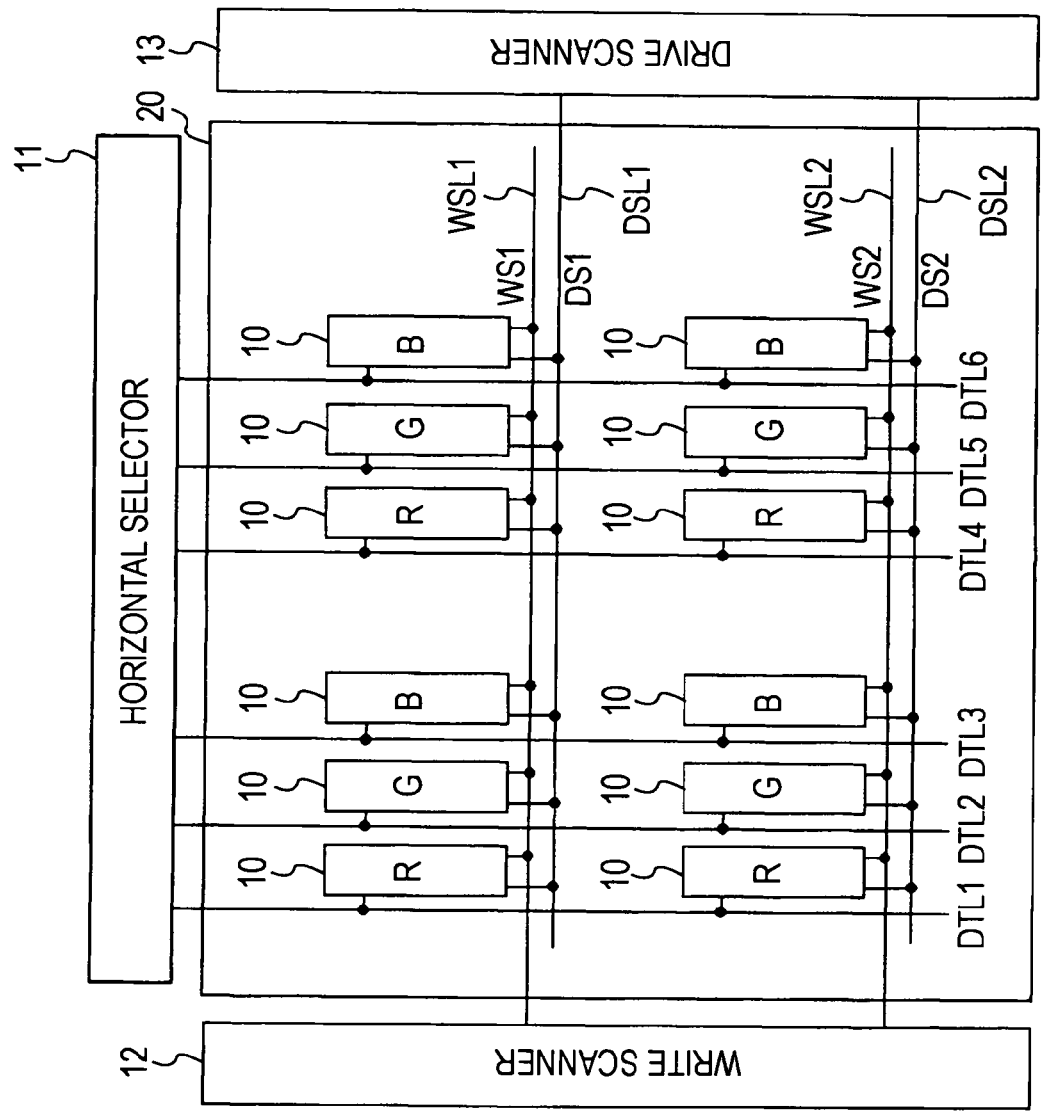
FIG. 1 is a diagram explaining the configuration of a display apparatus according to an embodiment of the present invention.

FIG. 1 illustrates the entire structure of a display apparatus according to an embodiment of the present invention. The display apparatus includes pixel circuits 10 having a function of compensating for a variation in threshold voltage of a drive transistor and a variation in mobility thereof, as will be described below.

Referring to FIG. 1, the display apparatus according to the present embodiment includes a pixel array portion 20 in which the pixel circuits 10 are arranged in a matrix of columns and rows, or in the column direction and the row direction. The pixel circuits 10 are assigned reference symbols "R", "G", and "B", respectively. This assignment means that the pixel circuits 10 correspond to light emitting pixels of different colors of red (R), green (G), and blue (B).

The display apparatus further includes a horizontal selector 11, a write scanner (writing scanner) 12, and a drive scanner (driving control scanner) 13 for driving the respective pixel circuits 10 in the pixel array portion 20.

Signal lines DTL1, DTL2, ... for supplying a video signal according to luminance information to the pixel circuit 10 when being selected by the horizontal selector 11 are arranged in the column direction in the pixel array portion 20. The signal lines DTL1, DTL2, ... are equal in number to the columns of the pixel circuits 10 arranged in the matrix in the pixel array portion 20.

In addition, write control lines WSL1, WSL2, ... and power control lines DSL1, DSL2, ... are arranged in the row direction in the pixel array portion 20. The write control lines WSL and the power control lines DSL are equal in number to the rows of the pixel circuits 10 arranged in the matrix in the pixel array portion 20.

The write control lines WSL (WSL1, WSL2, ... ) are driven by the write scanner 12. The write scanner 12 sequentially supplies scan pulses WS (WS1, WS2, ... ) to the respective write control lines WSL1, WSL2, ... arranged in rows at predetermined intervals, thereby line-sequentially scanning the pixel circuits 10 on a row-by-row basis.

The power control lines DSL (DSL1, DSL2, ... ) are driven by the drive scanner 13. The drive scanner 13 supplies power control pulses DS (DS1, DS2, ... ) to the respective power control lines DSL1, DSL2, ... arranged in rows synchronously with line-sequential scanning by the write scanner 12.

The horizontal selector 11 supplies a signal potential Vsig and a reference potential Vofs as input signals for the pixel circuits 10 to the signal lines DTL1, DTL2, ... arranged in the column direction synchronously with the line-sequential scanning by the write scanner 12. In the present embodiment, the horizontal selector 11 also generates a correction signal VsigL that is a lower voltage than the signal potential Vsig as a luminance signal value, as will be described below.

Figure 2:
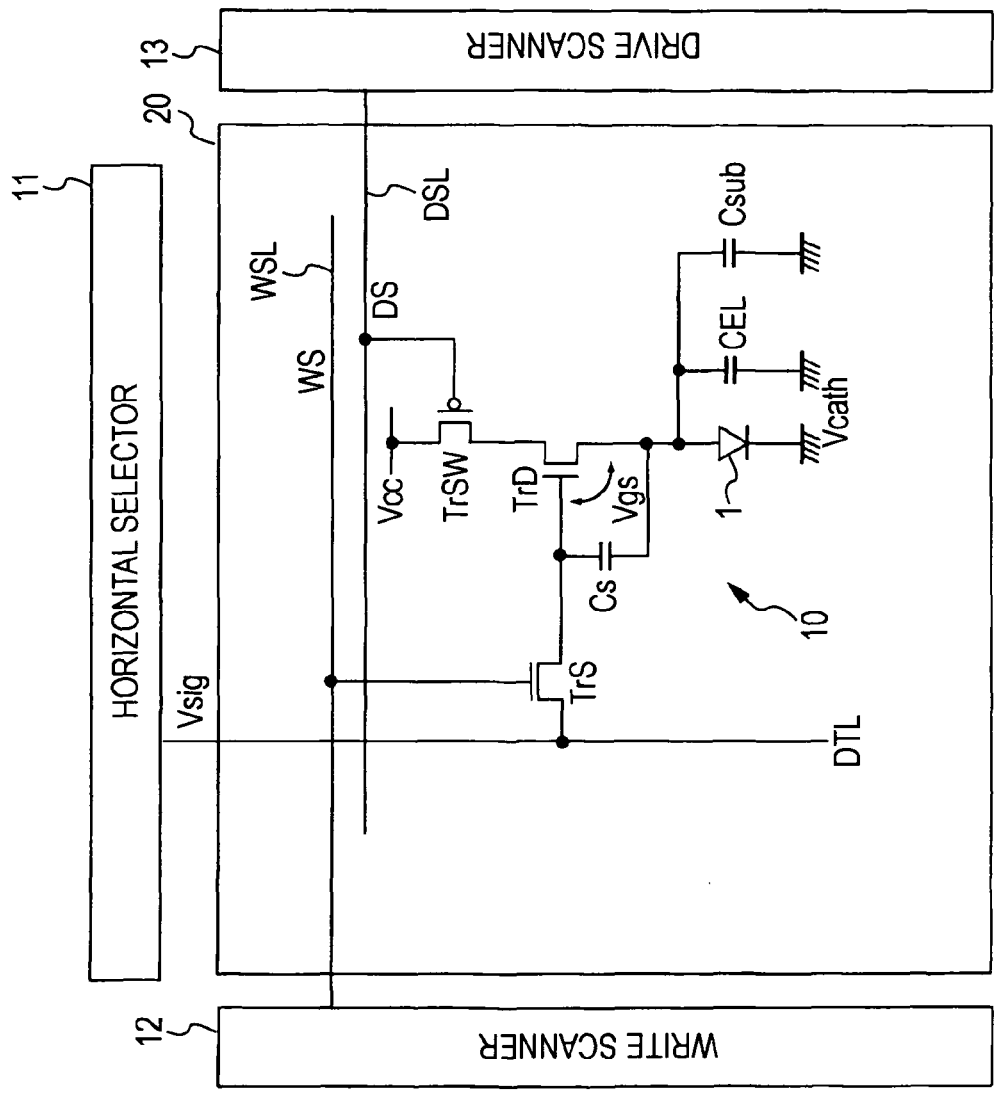
FIG. 2 is a diagram explaining the configuration of a pixel circuit in accordance with the embodiment.

FIG. 2 illustrates the configuration of each pixel circuit 10. The pixel circuits 10 having such a configuration are arranged in a matrix as shown in FIG. 1. For the sake of simplicity, FIG.

2 illustrates only one pixel circuit 10 disposed in the vicinity of the intersection of the signal line DTL, the write control line WSL, and the power control line DSL.

The pixel circuit 10 includes an organic EL element 1 which serves as a light emitting element, a holding capacitor Cs, and three thin film transistors (TFTs), i.e., a sampling transistor TrS, a drive transistor TrD, and a switching transistor TrSW. The pixel circuit 10 further includes an auxiliary capacitor Csub.

The sampling transistor TrS and the drive transistor TrD are n-channel TFTs and the switching transistor TrSW is a p-channel TFT.

One terminal of the holding capacitor Cs is connected to the source of the drive transistor TrD. The other terminal thereof is connected to the gate of the drive transistor TrD.

The organic EL element 1 having, for example, a diode structure functions as a light emitting element of the pixel circuit 10. The organic EL element 1 has an anode and a cathode. The anode of the organic EL element 1 is connected to the source of the drive transistor TrD. The cathode thereof is connected to a predetermined grounding wire (at a cathode potential Vcath). A capacitor CEL is a parasitic capacitor of the organic EL element 1.

The auxiliary capacitor Csub is connected between the anode and the cathode of the organic EL element 1.

One end of each of the drain and the source of the sampling transistor TrS is connected to the signal line DTL. The other end thereof is connected to the gate of the drive transistor TrD. The gate of the sampling transistor TrS is connected to the write control line WSL.

One end of each of the drain and the source of the switching transistor TrSW is connected to a power supply line for a drive voltage Vcc. The other end thereof is connected to the drain of the drive transistor TrD. The gate of the switching transistor TrSW is connected to the power control line DSL.

Light emission of the organic EL element 1 is fundamentally driven as follows.

At the time when the signal potential Vsig is applied to the signal line DTL, the sampling transistor TrS is brought into conduction (hereinafter, also referred to as "turned on") in response to the scan pulse WS supplied through the write control line WSL from the write scanner 12. Thus, the input signal Vsig supplied through the signal line DTL is written into the holding capacitor Cs.

The switching transistor TrSW is turned on or off in response to the power control pulse DS supplied from the drive scanner 13 to the power control line DSL. Since the switching transistor TrSW is turned on, the drive voltage Vcc is applied to the drive transistor TrD.

When being supplied with current by the application of the drive voltage Vcc, the drive transistor TrD allows a current corresponding to the signal potential held by the holding capacitor Cs to flow into the organic EL element 1, thus causing the organic EL element 1 to emit light.

In addition, the pixel circuit 10 performs an operation for cancelling out the effect of a variation in threshold voltage Vth of the drive transistor TrD prior to current driving of the organic EL element 1. Furthermore, the pixel circuit 10 performs a mobility correction operation for canceling out the effect of a variation in mobility of the drive transistor TrD when writing the input signal Vsig supplied from the signal line DTL into the holding capacitor Cs in the above-described manner.

2. Operation of Pixel Circuit in Process Leading to Embodiment

An operation of the pixel circuit 10 considered in the process leading to the embodiment of the present invention will now be described. Specifically, the circuit operation including an operation (for Vth correction) of canceling out a variation in the threshold voltage Vth of the drive transistor TrD and an operation (for mobility correction) of canceling out a variation in the mobility of the drive transistor TrD will be described below.

Figure 3:
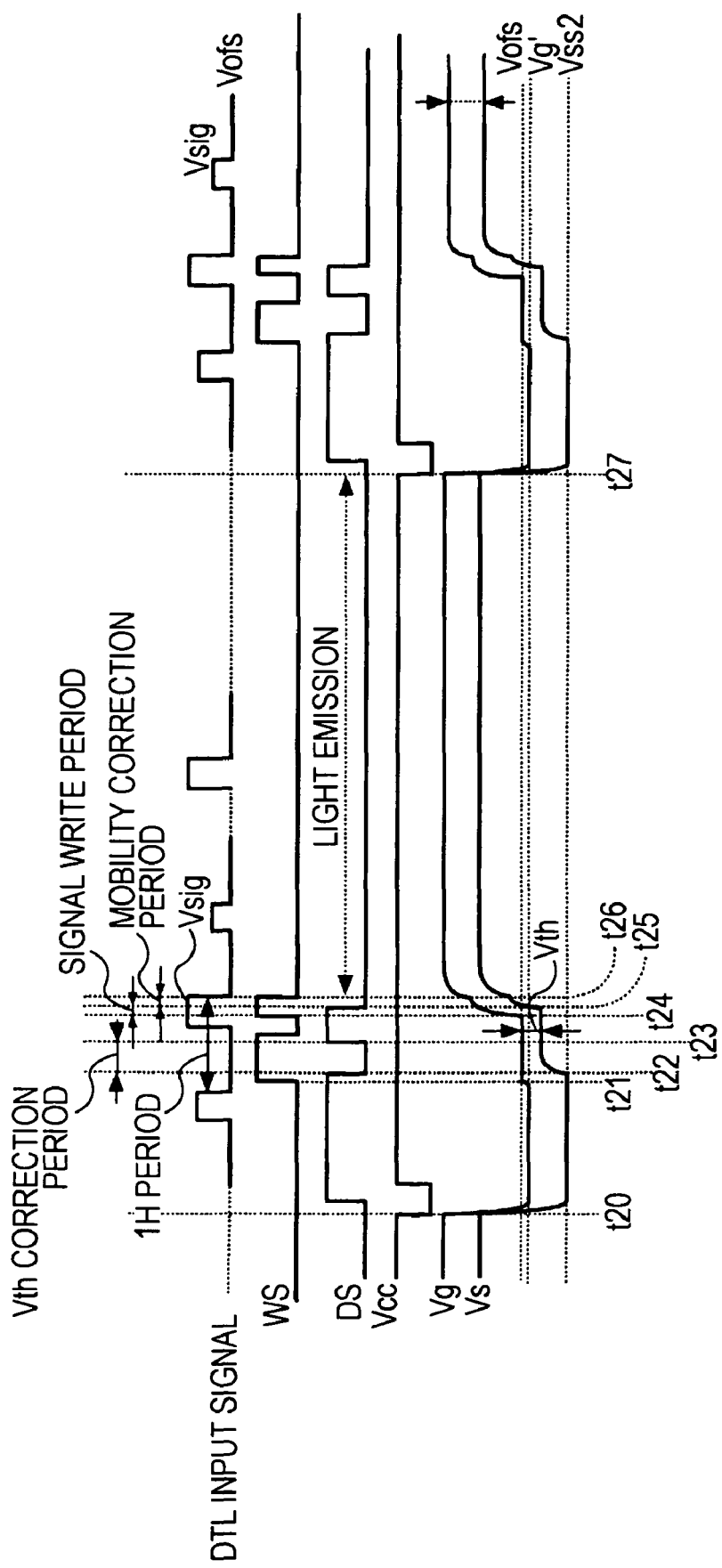
FIG. 3 is a diagram explaining an operation of the pixel circuit considered in a process leading to the embodiment.

Referring to FIG. 3, a potential (the signal potential Vsig or the reference potential Vofs) supplied to the signal line DTL by the horizontal selector 11 is illustrated as a DTL input signal.

The scan pulse WS is a pulse supplied to the write control line WSL by the write scanner 12. The scan pulse Ws causes the sampling transistor TrS to be switched between conduction (ON state) and non-conduction (OFF state).

The power control pulse DS is a pulse supplied to the power control line DSL by the drive scanner 13. The drive voltage Vcc is also illustrated.

FIG. 3 further illustrates a fluctuation in gate potential Vg of the drive transistor TrD and a fluctuation in source potential Vs thereof.

A period between time t20 and time t27 in the timing chart of FIG. 3 corresponds to one cycle during which the organic EL element 1, serving as a light emitting element, is driven to emit light. Time t20 corresponds to the start time of one frame period for, for example, image display.

First, at time t20, the drive voltage Vcc is temporarily decreased to a potential Vss2. Thus, the organic EL element 1 enters a non-light emission state.

In this state, the drive scanner 13 sets the power control pulse DS to a level "H" (high), thus turning off the switching transistor TrSW. Turning off the switching transistor TrSW stops power supply to the drive transistor TrD. After that, the supply of the drive voltage Vcc restarts.

After time t20, the source potential Vs of the drive transistor TrD begins to decrease to the potential Vss2. The potential Vss2 is (cathode voltage Vcath of the organic EL element 1)+(threshold voltage of the organic EL element 1).

The gate potential Vg, which is floating, of the drive transistor TrD also decreases.

After that, preparation for the Vth correction operation is made at time t21. Specifically, while the signal line DTL is held at the reference potential Vofs, the scan pulse WS is set to the level "H", thus turning on the sampling transistor TrS. Consequently, the gate potential Vg of the drive transistor TrD is fixed to the reference potential Vofs. The source potential Vs is held at the potential Vss2.

As described above, a gate-to-source voltage Vgs of the drive transistor TrD is set to the threshold voltage Vth or higher, thus preparing for Vth correction.

Subsequently, the Vth correction operation is performed during a period between time t22 and time t23.

Specifically, the power control pulse DS is set to a level "L" (low) during the period between time t22 and time t23, thereby turning on the switching transistor TrSW. Consequently, the drive voltage Vcc is applied to the drive transistor TrD. Since the sampling transistor TrS is held in the ON state, the source potential Vs of the drive transistor TrD increases while the gate potential Vg of the drive transistor TrD is being fixed to the reference potential Vofs.

The Vth correction operation is completed when the gate-to-source voltage Vgs of the drive transistor TrD is equal to the threshold voltage Vth.

At time t23 when the Vth correction operation is completed, the power control pulse DS is set to the level "H" and the scan pulse WS is set to the level "L". Thus, the switching transistor TrSW and the sampling transistor TrS are turned off.

After the above-described Vth correction, writing of the signal value (Vsig) and mobility correction are performed.

First, while the signal line DTL is at the signal potential Vsig for the pixel circuit, the scan pulse WS goes to the level "H" at time t24. Consequently, the sampling transistor TrS is turned on, so that the signal potential Vsig is written into the holding capacitor Cs. In addition, the power control pulse DS goes to the level "L" at time t25, thereby turning on the switching transistor TrSW. Consequently, the mobility of the drive transistor TrD is corrected.

Specifically, the source potential Vs increases in accordance with the mobility of the drive transistor TrD during a period between time t25 and time t26. In this case, the higher the mobility of the drive transistor TrD, the larger the increased amount of the source potential Vs. Whereas, the lower the mobility of the drive transistor TrD, the smaller the increased amount of the source potential Vs. This results in an operation for adjusting the gate-to-source voltage Vgs of the drive transistor TrD in accordance with the mobility thereof during light emission.

At time t25, the sampling transistor TrS is turned off. The organic EL element 1 starts light emission when the source potential Vs exceeds the threshold value of the organic EL element 1.

The drive transistor TrD permits a drive current to flow into the organic EL element 1 in accordance with the potential held by the holding capacitor Cs, thus causing the organic EL element 1 to emit light. At that time, the source potential Vs of the drive transistor TrD is held at a predetermined operation point.

The drive voltage Vcc is applied from the power supply line to the drain of the drive transistor TrD so that the drive transistor TrD operates in a saturation region at any time. Accordingly, the drive transistor TrD functions as a constant current source. A current Ids that flows into the organic EL element 1 depends on the gate-to-source voltage Vgs of the drive transistor TrD and is expressed by the following expression:

$$I_{ds} = \frac{1}{2}\mu\frac{W}{L}C_{ox}(V_{gs} - V_{th})^2 \quad (1)$$

where, Ids denotes the current flowing between the drain and the source of the drive transistor TrD operating in the saturation region, μ denotes the mobility thereof, W denotes the width of the channel thereof, L denotes the length of the channel thereof, Cox denotes the gate capacitance thereof, Vth denotes the threshold voltage thereof, and Vgs denotes the gate-to-source voltage thereof.

Figure 4:
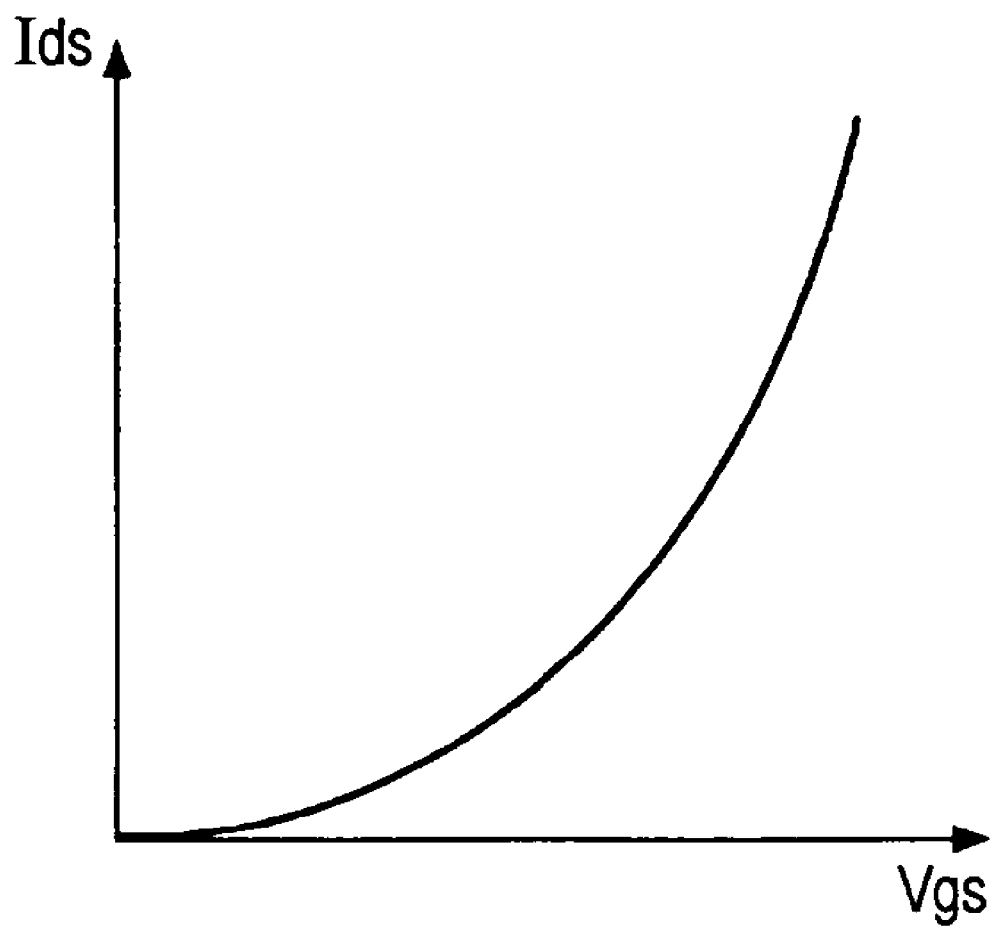
FIG. 4 is a graph explaining the Ids-Vgs characteristic of a drive transistor.

As will be understood from Expression 1, the current Ids depends on the square of the gate-to-source voltage Vgs of the drive transistor TrD. Accordingly, the relationship between the current Ids and the gate-to-source voltage Vgs is as shown in FIG. 4.

In the saturation region, the drain current Ids of the drive transistor TrD is controlled by the gate-to-source voltage Vgs. Since the gate-to-source voltage Vgs (=Vsig+Vth) of the drive transistor TrD is held constant by the action of the holding capacitor Cs, the drive transistor TrD functions as the constant current source that supplies a constant current to the organic EL element 1.

Consequently, the anode potential (source potential Vs) of the organic EL element 1 increases to a voltage at which the current flows into the organic EL element 1, so that the organic EL element 1 emits light. In other words, light emission starts at a luminance corresponding to the input signal voltage Vsig in this frame.

As described above, the pixel circuit 10 performs the operation for light emission of the organic EL element 1 for one frame period, the operation including the Vth correction operation and the mobility correction operation.

The Vth correction operation can cause the organic EL element 1 to be supplied with a current corresponding to the signal potential Vsig irrespective of a variation in the threshold voltage Vth of the drive transistor TrD and/or a fluctuation of the threshold voltage Vth due to a change over time in each pixel circuit 10. In other words, a manufacturing variation in the threshold voltage Vth or a variation in the threshold voltage Vth due to a change over time is cancelled out, so that high image quality can be maintained without causing an unevenness in luminance on a screen.

Since the drain current fluctuates depending on the mobility of the drive transistor TrD, the image quality is deteriorated due to a variation in the mobility of the drive transistor TrD in each pixel circuit 10. The mobility correction operation causes the source potential Vs to be obtained in accordance with the magnitude of the mobility of the drive transistor TrD, thus adjusting the gate-to-source voltage Vgs so that a variation in the mobility of the drive transistor TrD in each pixel circuit 10 is cancelled out. Advantageously, deterioration in image quality caused by a variation in the mobility is also prevented.

To pursue the development of higher definition and higher luminance of an organic EL panel, however, the direct application of the above-described circuit operation may cause an adverse effect on a mobility correction period.

The current Ids upon mobility correction is expressed by the following expression.

$$I_{ds} = k\mu\left(\frac{V_{sig}}{1 + V_{sig}\frac{k\mu}{C}t}\right)^2 \quad (2)$$

In Expression (2), a coefficient k is expressed as k=(½)·(W/L)·Cox and C denotes a pixel capacitance which is expressed as C=Cs+Csub+CEL in the pixel circuit 10 in FIG. 2.

An optimum mobility correction time t is expressed by the following expression.

$$t = \frac{C}{k\mu V_{sig}} \quad (3)$$

The above-described expression exhibits that the optimum mobility correction time t becomes shorter with decreasing the pixel capacitance C, alternatively, increasing the signal value Vsig or the transistor size.

As the pixel size is reduced in order to achieve higher definition of the panel, the pixel capacitance C inevitably decreases. To realize higher luminance, the signal value Vsig or the transistor size has to be increased.

In other words, to pursue the development of higher definition and higher luminance, the optimum mobility correction time t decreases.

In the circuit operation described with reference to FIG. 3, the period (between time t25 and time t26) for mobility correction corresponds to an interval between the fall time of the power control pulse DS and that of the scan pulse WS.

From a design viewpoint, the timing of the power control pulse DS and that of the scan pulse WS are determined on the basis of the above-described optimum mobility correction time t. Accordingly, the period for mobility correction is decreased with advancing higher definition and higher luminance.

Note that an error in the timing of the power control pulse DS or the scan pulse WS affects mobility correction.

Inevitably, the timing of the power control pulse DS generated by the drive scanner 13 and the timing of the scan pulse WS generated by the write scanner 12 include a certain amount of error.

So long as the period for mobility correction is long to some extent, a fluctuation of the pulse timing hardly affects mobility correction. The reason is that a fluctuation of error in the pulse timing is negligible as compared to the length of the mobility correction period.

Assuming that the mobility correction period decreases, however, even if the pulse timing includes substantially the same amount of error, the timing error is increased relative to the mobility correction period.

In other words, a negligible fluctuation caused by the pulse timing error affects the mobility correction period. Unfortunately, the optimum mobility correction may not be achieved.

If the mobility correction is not properly performed, a linear defect occurs in a display image, thus resulting in deterioration in the image quality.

Accordingly, even if the pixel capacitance C decreases or the signal value Vsig or the transistor size increases, it is desirable to provide a somewhat long mobility correction period.

3. Operation of Pixel Circuit in Embodiment

A method capable of extending the mobility correction period according to an embodiment of the present invention will be described below.

Figure 5:
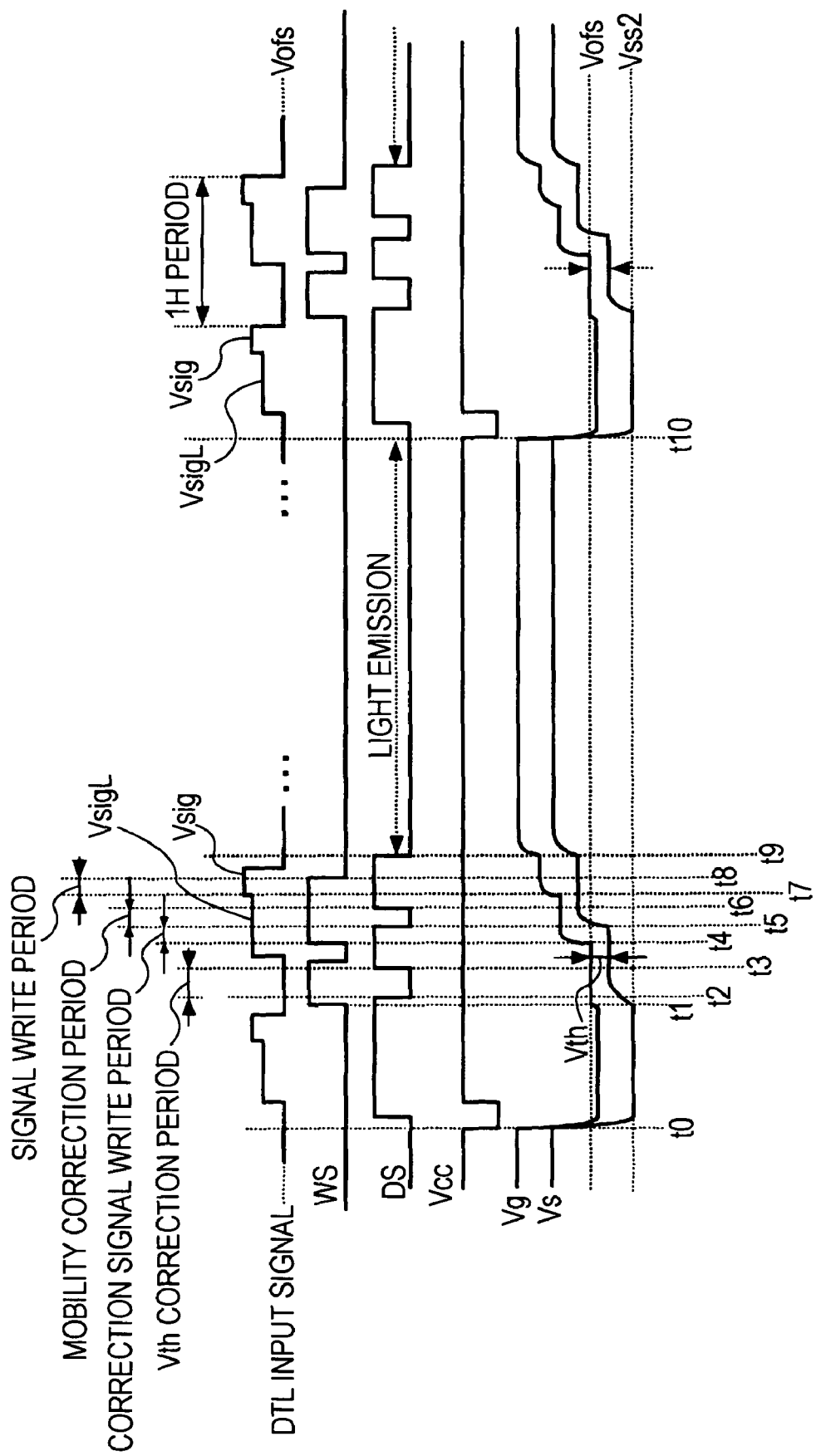
FIG. 5 is a diagram explaining an operation of the pixel circuit in the embodiment.

FIG. 5 illustrates the circuit operation in accordance with the embodiment.

In FIG. 5, a potential applied to the signal line DTL by the horizontal selector 11 is indicated as a DTL input signal in the same way as FIG. 3. In this embodiment, the horizontal selector 11 supplies a correction signal value VsigL prior to the supply of the signal potential Vsig to the signal line DTL. Specifically, the horizontal selector 11 switches between the signal potential Vsig, the correction signal value VsigL, and the reference potential Vofs at predetermined intervals.

The signal value Vsig is the value of a luminance signal for a pixel, the luminance signal being generated on the basis of an image signal. For example, it is assumed that the signal value Vsig ranges from 2V to 8V and a signal voltage is controlled at any of a predetermined number of grayscale levels (for example, 256 grayscale levels) in this range. The correction signal value VsigL is a lower voltage than a signal value to be supplied.

Figure 7:
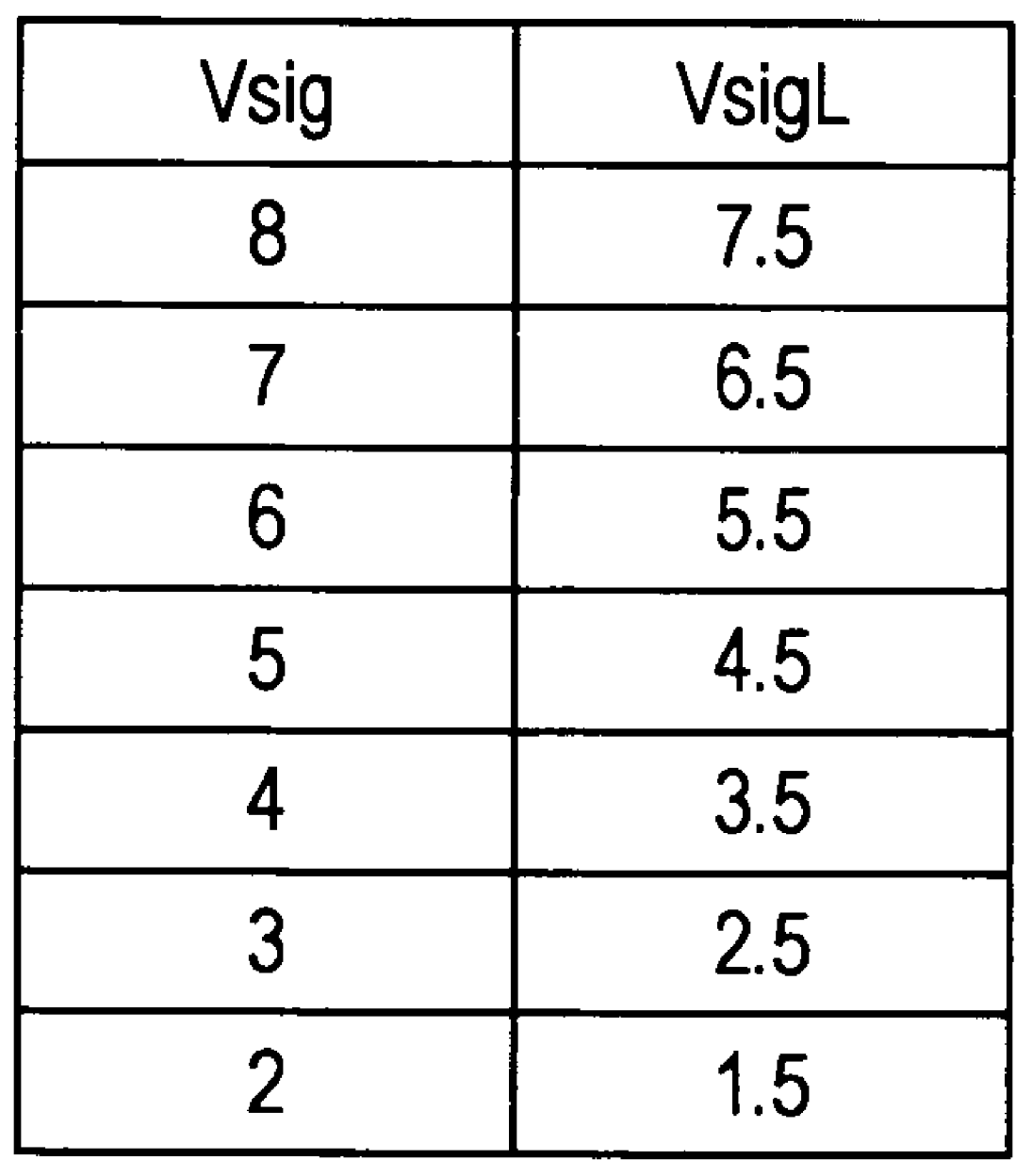

FIG. 7 shows correction signal values VsigL used when 2V, 3V, . . . , and 8V are supplied as signal values Vsig. In this case, each correction signal value VsigL is lower than the corresponding signal value Vsig by 0.5V. The correction signal values VsigL are not limited to the values in this case.

Referring to FIG. 5, the scan pulse WS is a pulse supplied to the write control line WSL by the write scanner 12.

The power control pulse DS is a voltage applied to the power control line DSL by the drive scanner 13. The drive voltage Vcc is also illustrated.

FIG. 5 further illustrates a fluctuation of the gate potential Vg of the drive transistor TrD and that of the source potential Vs thereof.

At time t0 in the timing chart of FIG. 5, one cycle of the light emission operation of the organic EL element 1 (one frame period of image display: t0 to t10) starts.

At time t0, the drive voltage Vcc is temporarily decreased to the potential Vss2. Thus, the organic EL element 1 enters the non-light emission state.

In this state, the drive scanner 13 sets the power control pulse DS to the level "H", thus turning off the switching transistor TrSW. Turning off the switching transistor TrSW stops the power supply to the drive transistor TrD. After that, the supply of the drive voltage Vcc restarts.

At time t0, the source potential Vs of the drive transistor TrD begins to decrease to the potential Vss2. The gate potential Vg, which is floating, of the drive transistor TrD also decreases.

After that, preparation for the Vth correction processing is performed at time t1. Specifically, while the signal line DTL is held at the reference potential Vofs, the scan pulse WS is set to the level "H", thus turning on the sampling transistor TrS. Consequently, the gate potential Vg of the drive transistor TrD is fixed to the reference potential Vofs. The source potential Vs is held at the potential Vss2.

As described above, the gate-to-source voltage Vgs of the drive transistor TrD is set to the threshold voltage Vth or higher, thus preparing for Vth correction.

Subsequently, the Vth correction operation is performed during a period between time t2 and time t3.

Specifically, during the period between time t2 and time t3, the power control pulse DS is set to the level "L", thus turning on the switching transistor TrSW. Consequently, the drive voltage Vcc is applied to the drive transistor TrD. Since the sampling transistor TrS is held in the ON state, the source potential Vs of the drive transistor TrD increases while the gate potential Vg thereof is being fixed to the reference potential Vofs.

The Vth correction operation is completed when the gate-to-source voltage Vgs of the drive transistor TrD is equal to the threshold voltage Vth.

At time t3 when the Vth correction operation is completed, the power control pulse DS is set to the level "H" and the scan pulse WS is set to the level "L". Thus, the switching transistor TrSW and the sampling transistor TrS are turned off.

After the above-described Vth correction operation, writing of the signal value (Vsig) and mobility correction are performed. In this embodiment, the following operation is performed during a period between time t4 and time t9.

First, while the holding capacitor Cs is allowed to hold the correction signal value VsigL lower than the signal value Vsig to be supplied to the holding capacitor Cs, the drive voltage Vcc is supplied to the drive transistor TrD, thus performing the mobility correction operation for the drive transistor TrD.

After the mobility correction operation, the holding capacitor Cs is allowed to hold the original signal value Vsig and the drive voltage Vcc is supplied to the drive transistor TrD, thus causing the organic EL element 1 to perform the light emission operation at a luminance corresponding to the signal value Vsig.

Figure 6:
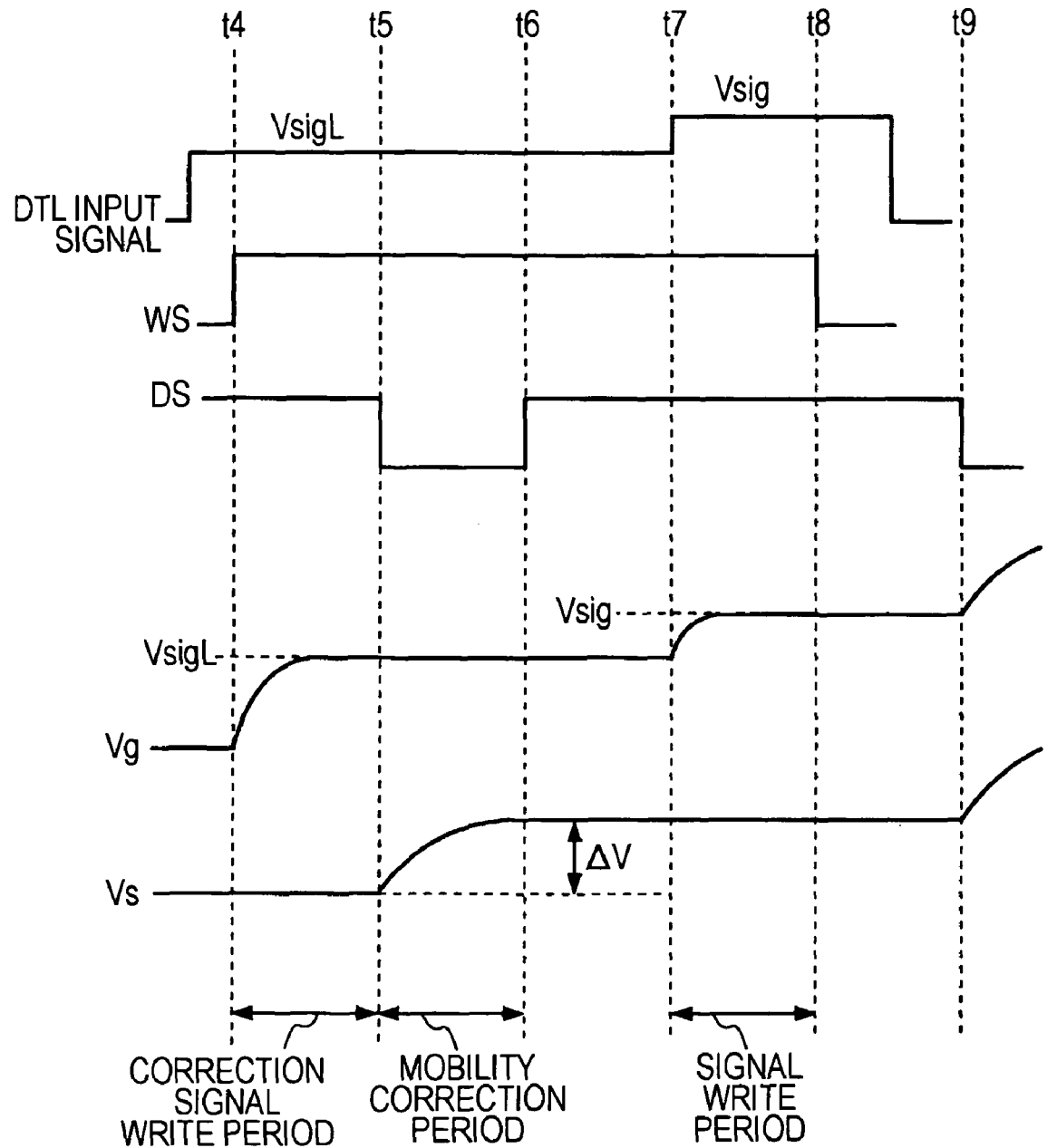
FIG. 6 is a diagram explaining a signal write period and a mobility correction period in the operation of the pixel circuit in the embodiment.

FIG. 6 illustrates an enlarged portion, corresponding to a period between time t4 and time t9, of FIG. 5.

Respective operations at time points t4 to t9 will now be described.

At time t4, the scan pulse WS goes to the level "H", thus turning on the sampling transistor TrS. Thus, the potential of the signal line DTL is applied to the gate of the drive transistor TrD.

As described above, the horizontal selector 11 supplies the correction signal value VsigL to the signal line DTL for a period before the supply of the signal value Vsig. Accordingly, at time t4, the correction signal value VsigL is written into the holding capacitor Cs. As described above, a period between time t4 and time t5 is a correction signal write period.

During a period between time t5 and time t6, the power control pulse DS goes to the level "L", thus turning on the switching transistor TrSW. The period between time t5 and time t6 is a mobility correction period.

Specifically, during the period between time t5 and time t6, while the correction signal value VsigL is being written into the holding capacitor Cs, the drive voltage Vcc is applied to the drive transistor TrD. Thus, the current Ids according to the correction signal value VsigL flows between the drain and the source of the drive transistor TrD. Consequently, the source potential Vs increases in accordance with the mobility of the drive transistor TrD (increase in correction voltage ΔV).

In this case, the higher the mobility of the drive transistor TrD, the larger the increased amount of the source potential Vs. Whereas, the lower the mobility, the smaller the increased amount of the source potential Vs. This leads to an operation for adjusting the gate-to-source voltage Vgs of the drive transistor TrD in accordance with the mobility during the light emission period.

After that, a period between time t7 and time t8 is a signal write period. Specifically, during this period, the horizontal selector 11 supplies the signal value Vsig to the signal line DTL. Since the sampling transistor TrS is in the ON state, the signal potential Vsig is written into the holding capacitor Cs.

The power control pulse DS again goes to the level "L".

When the source potential Vs exceeds the threshold value of the organic EL element 1, the organic EL element 1 emits light.

Specifically, the drive transistor TrD supplies a drive current according to the potential of the signal value Vsig held by the holding capacitor Cs, thus causing the organic EL element 1 to emit light. At that time, the source potential Vs of the drive transistor TrD is held at a predetermined operating point.

The drain of the drive transistor TrD is supplied with the drive voltage Vcc. Since the drive transistor TrD is set so as to operate in the saturation region at any time, the drive transistor TrD functions as a constant current source. The current Ids expressed by Expression (1), namely, the current according to the gate-to-source voltage Vgs of the drive transistor TrD flows into the organic EL element 1. Consequently, the organic EL element 1 emits light at a luminance corresponding to the signal value Vsig.

In the present embodiment, the above-described operations are performed. In other words, the correction signal value VsigL is written into the holding capacitor Cs during the period between time t4 and time t5 and the mobility correction is performed during the period between time t5 and time t6. After that, the signal value Vsig is written into the holding capacitor Cs during the period between time t7 and time t8 and the organic EL element 1 is caused to emit light at a luminance corresponding to the signal value Vsig.

The above-described operations can extend the mobility correction period. The reason will be described below.

In the present embodiment, the mobility correction is performed while the correction signal value VsigL that is a lower voltage than the original signal value Vsig is written into the holding capacitor Cs. After the signal value Vsig that is the original voltage is written into the holding capacitor Cs, the mobility correction is not performed and light emission is performed.

Specifically, as a mobility correction voltage necessary for the signal value Vsig of a certain grayscale level, the correction signal value VsigL of a lower grayscale level is used. This allows for extension of the mobility correction period necessary to yield a target luminance.

Generally, a voltage (hereinafter, also referred to as a "correction voltage") necessary to cancel out a variation in mobility has to be half the voltage amplitude of a written signal value (Vsig/2). For example, when light emission is performed at a voltage (Vsig=8V) corresponding to a white grayscale level, a voltage of 4V that is half the voltage is necessary for correction.

According to the present embodiment, correction at 4V is performed using the correction signal value VsigL (e.g., Vsig=7.5V) of a lower grayscale level.

A longer mobility correction time is necessary to correct the mobility for an original signal voltage using a lower signal voltage. Accordingly, a mobility correction time for yielding a certain luminance is set to be long.

Figure 8:
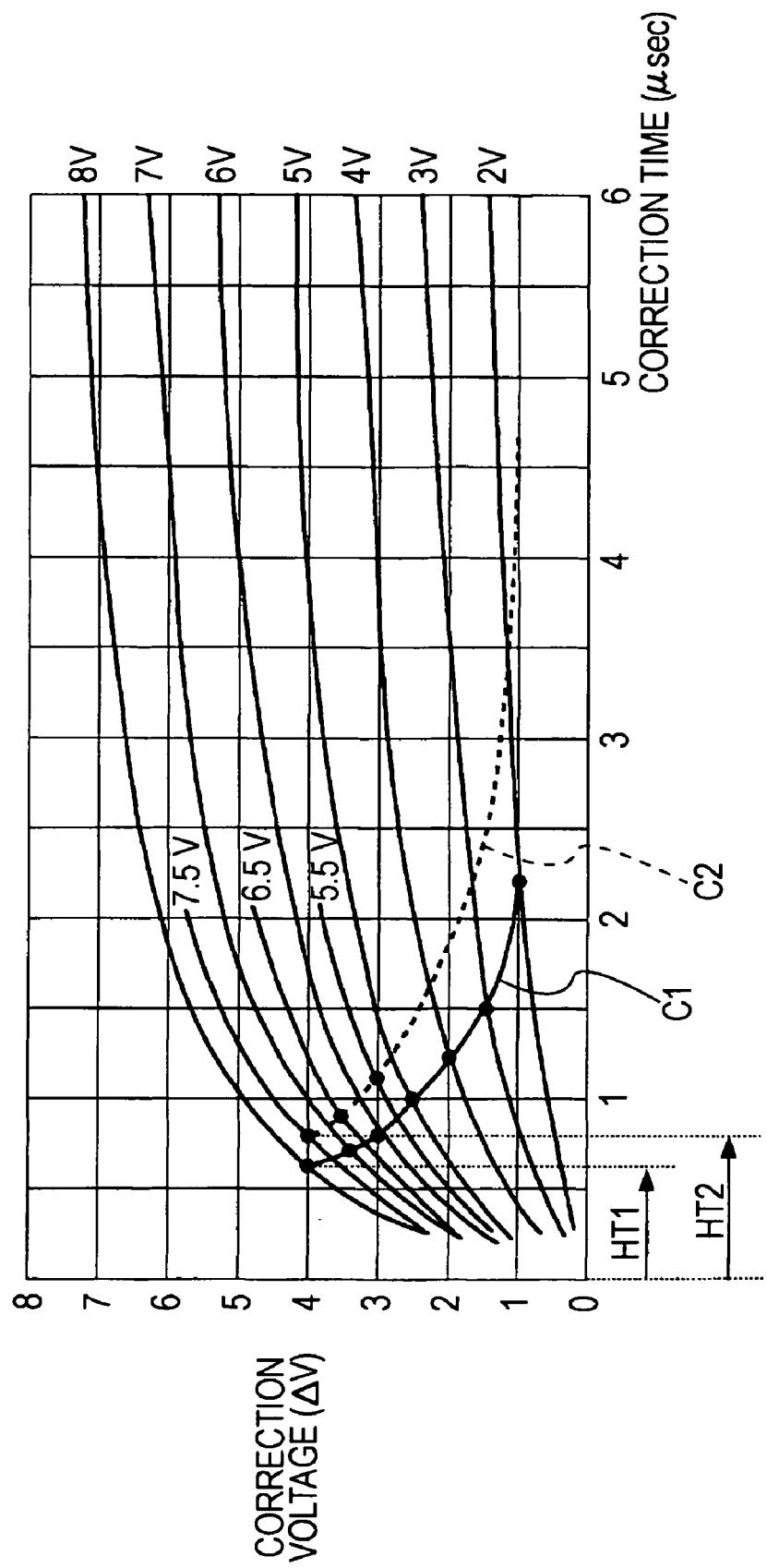
FIG. 8 is a diagram explaining extension of a mobility correction time in the embodiment.

FIG. 8 illustrates the relationship between a correction time for each of voltages of the respective signal values Vsig in the range of 2V to 8V and a correction voltage ΔV.

For example, when the signal value Vsig=8V, a correction voltage of 4V has to be used. Accordingly, a correction time is indicated at HT1 as shown in FIG. 8.

Assuming that the signal value Vsig=8V, when the correction signal value VsigL which is equal to 7.5V is applied to the gate of the drive transistor TrD, a correction time of HT2 is necessary for correction at 4V in consideration of the original signal value Vsig=8V, as shown in FIG. 8.

Referring to FIG. 8, a curve C1 indicates a correction time in the case where the mobility correction is performed while the signal value Vsig is supplied, as shown in the operating example of FIG. 3.

A curve C2, indicated by a dash line, denotes a correction time in the case where the mobility correction is performed while the correction signal value VsigL (see FIG. 7) lower than the original signal value Vsig by 0.5V is supplied, as shown in FIG. 5 illustrating the present embodiment.

When the curve C1 is compared to the curve C2, it will be understood that a correction time can be extended in the operating example of FIG. 5 than that of FIG. 3.

The extension of mobility correction time can reduce the effect of a pulse timing error on mobility correction.

For example, in the present embodiment, the period between time t5 and time t6, serving as the mobility correction period, is determined by the power control pulse DS. It is inevitable that the rise time and the fall time of the power control pulse DS have some margin of error. Since the mobility correction period is long, the effect of such a timing error on the mobility correction period can be relatively reduced. In actual, the timing error of the power control pulse DS can be reduced to a negligible extent. Accordingly, the mobility correction period can be set to a proper length, thus achieving accurate mobility correction.

In other words, according to the operating example of the present embodiment, in each pixel circuit having a predetermined pixel capacitance, higher luminance can be realized without reducing a mobility correction time. In addition, even when each pixel circuit has a smaller pixel capacitance, higher luminance can be similarly obtained without reducing a mobility correction time. Advantageously, higher definition of a panel can also be realized.

FIG. 8 illustrates the relationship in the case where each correction signal value VsigL is lower than the corresponding signal value Vsig by 0.5V, as shown in FIG. 7. The correction signal value VsigL may be determined in various manners.

Figure 9:
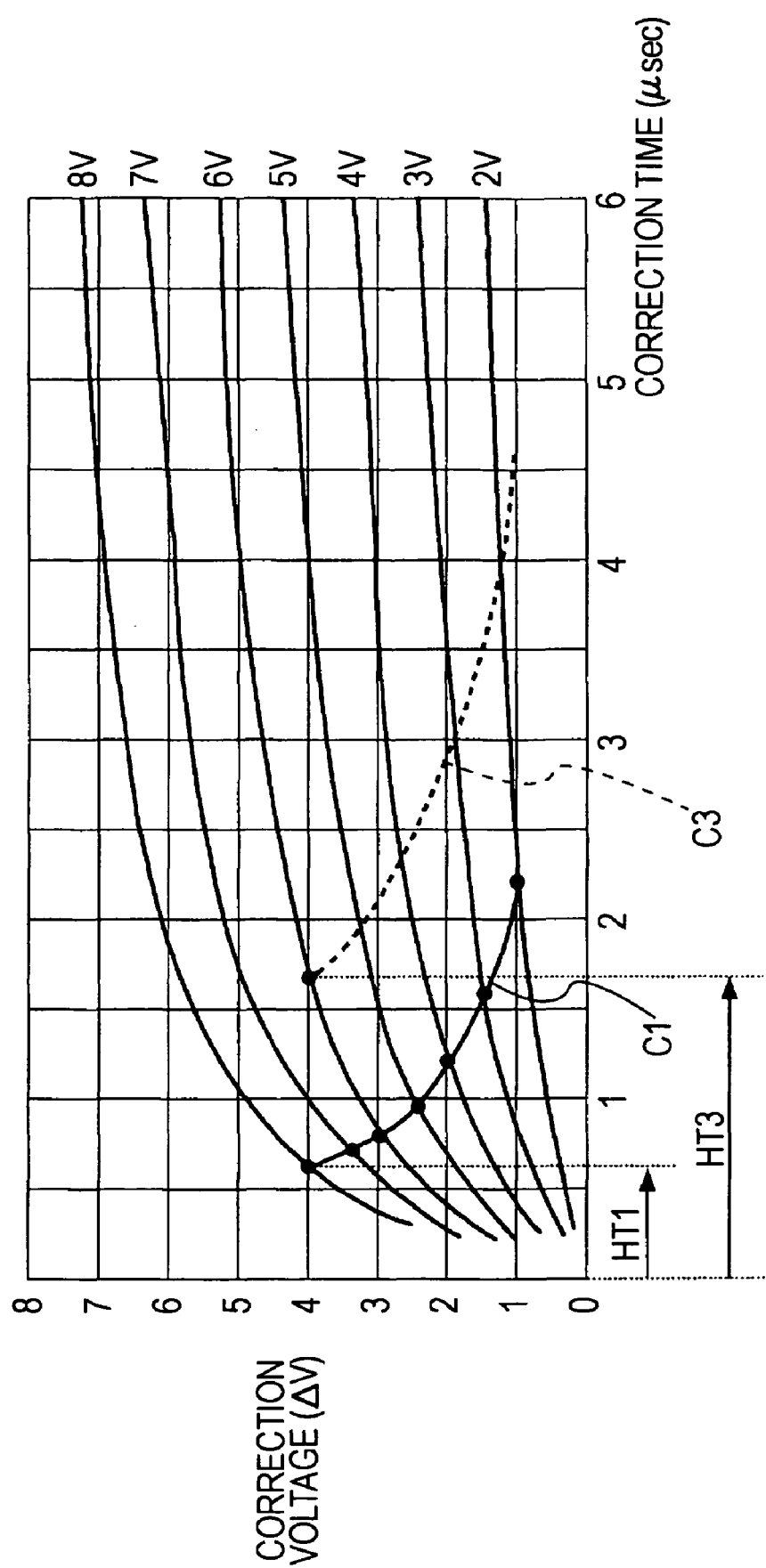
FIG. 9 is a diagram explaining extension of a mobility correction time in another embodiment.

For example, when a correction signal value VsigL corresponding to the signal value Vsig=8V is 6V, a time necessary for correction at 4V when the signal value Vsig=8V can be extended from HT1 to HT3, as shown in FIG. 9. In this case, the correction time can be extended from about 0.7 μsec (HT1) to about 1.7 μsec (HT3), namely, by about 2.4 times.

When correction signal values VsigL are properly set for respective signal values Vsig other than that of 8V, correction times can be set as shown by a curve C3, indicated by a dash line, in FIG. 9.

The correction signal values VsigL for the respective signal values may be properly determined in consideration of the circuit operation and design.

While the embodiments of the present invention have been described, it should be understood that the present invention is not limited to those embodiments and various changes and modifications thereof could be made.

For example, the foregoing embodiment has been described with respect to the case where the pixel circuit 10 includes the three transistors TrD, TrS, and TrSW, and the holding capacitor Cs, as shown in FIG. 2. The present invention may be applied to a pixel circuit having another configuration, for example, including four or more transistors.

In addition, so long as the drive voltage Vcc supplied to the power supply line is switched between a drive potential and an initial potential, the switching transistor TrSW may be omitted. The present invention can be applied to a pixel circuit having such a configuration (namely, including the transistors TrD and TrS and the holding capacitor Cs).

The present application contains subject matter related to that disclosed in Japanese Priority Patent Application JP 2008-260608 filed in the Japan Patent Office on Oct. 7, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a pixel array including pixel circuits arranged in a matrix, each pixel circuit including at least a light emitting element, a drive transistor in which a drive voltage is applied between the drain and the source to supply a current corresponding to a signal value supplied between the gate and the source to the light emitting element, and a holding capacitor which is connected between the gate and the source of the drive transistor and which holds the input signal value;
mobility correction operating means for supplying the drive voltage to the drive transistor while allowing the holding capacitor to hold a correction signal value that is a lower voltage than that of the signal value, which is to be supplied to the holding capacitor, to perform a mobility correction operation for correcting the mobility of the drive transistor; and
light emission operating means for, after the mobility correction operation, introducing the signal value to the holding capacitor and supplying the drive voltage to the drive transistor to perform a light emission operation for causing the light emitting element to emit light at a luminance corresponding to the signal value.

2. The apparatus according to claim 1, further comprising:
a signal selector configured to supply the signal value, the correction signal value, and a potential as a reference value to signal lines arranged in columns in the pixel array;
a writing scanner configured to drive write control lines arranged in rows in the pixel array to apply the potential in the signal line to the pixel circuit; and
a driving control scanner configured to apply the drive voltage to the drive transistor of the pixel circuit using power control lines arranged in rows in the pixel array, wherein
the mobility correction operating means is realized by an operation, performed by the writing scanner, for setting the correction signal value supplied from the signal line to a gate potential of the drive transistor and an operation, performed by the driving control scanner, for supplying the drive voltage to the drive transistor, and
the light emission operating means is realized by an operation, performed by the writing scanner, for setting the signal value supplied from the signal line to the gate potential of the drive transistor and an operation, performed by the driving control scanner, for supplying the drive voltage to the drive transistor.

3. The apparatus according to claim 2, wherein
each pixel circuit further includes a sampling transistor in addition to the light emitting element, the drive transistor, and the holding capacitor,
the gate of the sampling transistor is connected to the write control line, one of the source and the drain thereof is connected to the signal line, and the other one is connected to the gate of the drive transistor,
after the writing scanner brings the sampling transistor into conduction while a potential applied from the signal selector to the signal line is the correction signal value, the driving control scanner performs the operation for supplying the drive voltage to the drive transistor, thus performing the operation of the mobility correction operating means, and
after the writing scanner brings the sampling transistor into conduction while a potential applied from the signal selector to the signal line is the signal value, the driving control scanner performs the operation for supplying the drive voltage to the drive transistor, thus performing the operation of the light emission operating means.

4. A display driving method for a display apparatus including a pixel array including pixel circuits arranged in a matrix, each pixel circuit including at least a light emitting element, a drive transistor in which a drive voltage is applied between the drain and the source to supply a current corresponding to a signal value supplied between the gate and the source to the light emitting element, and a holding capacitor which is connected between the gate and the source of the drive transistor and which holds the input signal value, the method comprising the steps of:
supplying the drive voltage to the drive transistor while allowing the holding capacitor to hold a correction signal value that is a lower voltage than that of the signal value, which is to be supplied to the holding capacitor, to perform a mobility correction operation for correcting the mobility of the drive transistor; and after the mobility correction operation,
introducing the signal value to the holding capacitor and supplying the drive voltage to the drive transistor to perform a light emission operation for causing the light emitting element to emit light at a luminance corresponding to the signal value.

5. The display driving method according to claim 4, further comprising:
- supplying, by a signal selector, the signal value, the correction signal value, and a potential as a reference value to signal lines arranged in columns in the pixel array;
- driving, by a writing scanner, write control lines arranged in rows in the pixel array to apply the potential in the signal line to the pixel circuit; and
- applying, by a driving control scanner, the drive voltage to the drive transistor of the pixel circuit using power control lines arranged in rows in the pixel array,
- wherein the mobility correction operating means is realized by an operation, performed by the writing scanner, for setting the correction signal value supplied from the signal line to a gate potential of the drive transistor and an operation, performed by the driving control scanner, for supplying the drive voltage to the drive transistor, and
- wherein the light emission operating means is realized by an operation, performed by the writing scanner, for setting the signal value supplied from the signal line to the gate potential of the drive transistor and an operation, performed by the driving control scanner, for supplying the drive voltage to the drive transistor.

6. The display driving method according to claim 5, wherein
- each pixel circuit further includes a sampling transistor in addition to the light emitting element, the drive transistor, and the holding capacitor,
- the gate of the sampling transistor is connected to the write control line, one of the source and the drain thereof is connected to the signal line, and the other one is connected to the gate of the drive transistor,
- after the writing scanner brings the sampling transistor into conduction while a potential applied from the signal selector to the signal line is the correction signal value, the driving control scanner performs the operation for supplying the drive voltage to the drive transistor, thus performing the operation of the mobility correction operating means, and
- after the writing scanner brings the sampling transistor into conduction while a potential applied from the signal selector to the signal line is the signal value, the driving control scanner performs the operation for supplying the drive voltage to the drive transistor, thus performing the operation of the light emission operating means.

7. A display apparatus comprising:
- a pixel array including pixel circuits arranged in a matrix, each pixel circuit including at least a light emitting element, a drive transistor in which a drive voltage is applied between the drain and the source to supply a current corresponding to a signal value supplied between the gate and the source to the light emitting element, and a holding capacitor which is connected between the gate and the source of the drive transistor and which holds the input signal value;
- a mobility correction operating unit configured to supply the drive voltage to the drive transistor while allowing the holding capacitor to hold a correction signal value that is a lower voltage than that of the signal value, which is to be supplied to the holding capacitor, to perform a mobility correction operation for correcting the mobility of the drive transistor; and
- light emission operating unit configured to introduce, after the mobility correction operation, the signal value to the holding capacitor and supply the drive voltage to the drive transistor to perform a light emission operation for causing the light emitting element to emit light at a luminance corresponding to the signal value.

8. The display apparatus according to claim 7, further comprising:
- a signal selector configured to supply the signal value, the correction signal value, and a potential as a reference value to signal lines arranged in columns in the pixel array;
- a writing scanner configured to drive write control lines arranged in rows in the pixel array to apply the potential in the signal line to the pixel circuit; and
- a driving control scanner configured to apply the drive voltage to the drive transistor of the pixel circuit using power control lines arranged in rows in the pixel array, wherein
- the mobility correction operating unit is realized by an operation, performed by the writing scanner, for setting the correction signal value supplied from the signal line to a gate potential of the drive transistor and an operation, performed by the driving control scanner, for supplying the drive voltage to the drive transistor, and
- the light emission operating unit is realized by an operation, performed by the writing scanner, for setting the signal value supplied from the signal line to the gate potential of the drive transistor and an operation, performed by the driving control scanner, for supplying the drive voltage to the drive transistor.

9. The display apparatus according to claim 8, wherein
- each pixel circuit further includes a sampling transistor in addition to the light emitting element, the drive transistor, and the holding capacitor,
- the gate of the sampling transistor is connected to the write control line, one of the source and the drain thereof is connected to the signal line, and the other one is connected to the gate of the drive transistor,
- after the writing scanner brings the sampling transistor into conduction while a potential applied from the signal selector to the signal line is the correction signal value, the driving control scanner performs the operation for supplying the drive voltage to the drive transistor, thus performing the operation of the mobility correction operating unit, and
- after the writing scanner brings the sampling transistor into conduction while a potential applied from the signal selector to the signal line is the signal value, the driving control scanner performs the operation for supplying the drive voltage to the drive transistor, thus performing the operation of the light emission operating unit.

* * * * *